United States Patent
Ashihara et al.

(10) Patent No.: US 6,277,912 B1
(45) Date of Patent: Aug. 21, 2001

(54) AQUEOUS, CHLORINATED POLYOLEFIN-BASED RESIN COMPOSITION AND ITS MANUFACTURE

(75) Inventors: Teruaki Ashihara; Tadanori Funasaka; Shoji Maekawa; Ryozo Orita, all of Osaka (JP)

(73) Assignee: Toyo Kasei Kogyo Company Limited, Osaka (JP)

( * ) Notice: Subject to any disclaimer, the term of this patent is extended or adjusted under 35 U.S.C. 154(b) by 0 days.

(21) Appl. No.: 09/063,891

(22) Filed: Apr. 22, 1998

(51) Int. Cl.[7] .................................................. C08L 51/04
(52) U.S. Cl. .................................................. 525/65
(58) Field of Search .................. 524/501, 504, 524/507, 802, 820, 840, 839; 525/66, 69, 65

(56) References Cited

U.S. PATENT DOCUMENTS

| | | | | |
|---|---|---|---|---|
| 4,683,264 | * | 7/1987 | Urata et al. | 525/65 |
| 4,863,988 | * | 9/1989 | Inagaki et al. | 525/65 |
| 4,864,002 | * | 9/1989 | Schuetz et al. | 525/204 |
| 4,997,882 | * | 3/1991 | Martz et al. | 525/65 |
| 5,362,788 | | 11/1994 | Kimura et al. | 524/377 |
| 5,424,341 | * | 6/1995 | Ogoe et al. | 525/146 |
| 5,457,146 | * | 10/1995 | Ogoe et al. | 524/409 |
| 5,525,651 | * | 6/1996 | Ogoe et al. | 525/65 |
| 5,578,669 | * | 11/1996 | Odawa et al. | 524/839 |
| 5,587,410 | * | 12/1996 | Kanaida et al. | 524/808 |
| 5,609,962 | * | 3/1997 | Ouhadi | 428/480 |
| 5,767,188 | * | 6/1998 | Kamikuri et al. | |
| 5,880,190 | * | 3/1999 | Laura | 524/839 |
| 5,990,226 | * | 11/1999 | Arita et al. | 525/204 |

FOREIGN PATENT DOCUMENTS

WO93/04133  3/1993  (WO) .

* cited by examiner

*Primary Examiner*—Veronica P. Hoke
(74) *Attorney, Agent, or Firm*—Wenderoth, Lind & Ponack, L.L.P.

(57) ABSTRACT

An aqueous, chlorinated modified polyolefin-based resin composition and its manufacture, which resin composition provides, as an adhesive, a paint for ink, a coating material, etc., moldings and films consisting mainly of polyolefin-based resins with a coating film excellent at the properties such as adhesiveness, gasohol resistance, moisture resistance, impact resistance, flexibility, etc. and which resin composition is particularly good at environmental conservation, safety, and health and hygiene because the resin composition doesn't contain organic solvents including aromatic solvents such as xylene, toluene, etc.

12 Claims, No Drawings

AQUEOUS, CHLORINATED POLYOLEFIN-BASED RESIN COMPOSITION AND ITS MANUFACTURE

TECHNICAL FIELD OF THE INVENTION

This invention relates to less polluting or non-polluting, aqueous, chlorinated polyolefin-based resin compositions which are used as a primer or a coating composition for moldings or films consisting mainly of polyolefin resins, such as polypropylene, ethylene-propylene copolymers, and ethylene-propylene-butene copolymers. More detailedly explaining, this invention provides an aqueous, chlorinated polyolefin-based resin composition and a method of its manufacture, which resin composition, when used as a primer or a base coat for moldings or films of polyolefin-based resins, forms a coating film having a good adhesiveness to the polyolefin base material and also a good interlayer adhesiveness to the base coat and/or the top coat, and having good gasohol resistance, moisture resistance, impact resistance, and flexibility. When the composition is used as a single-coat material, it gives a coating film having a good adhesiveness to the polyolefin base material, and has a good miscibility or compatibility with polymer emulsions and pigments used in combination with it, and in addition keeps the physical properties of the coating film after exposure. In addition to the use as an adhesive as mentioned above, the resin composition is used for inks, coating materials, their primers, etc.

BACKGROUND OF THE INVENTION

Polyolefin resins are relatively inexpensive and have good properties such as chemicals resistance, water resistance, heat resistance, etc. Thus, they have been used as an industrial material in a wide range of applications; the use for auto parts is an example. Having those advantages, however, polyolefin resins are crystalline and have no reactive functional groups on their surface; so it has been difficult to apply adhesion and coatings to base materials of the polyolefin-based resin. To solve this problem, attempts have been made to improve the adhesiveness of coating films to polyolefin-based resins by modifying the resin surface through vapor cleaning, defatting, acid treatment, corona discharge treatment or plasma treatment. On the other hand, in the fields of the coatings, adhesives, and inks, chlorinated polyolefins, which have a relatively good adhesiveness to such hard-to-coat resin surfaces as mentioned above, have been used. However, most of those chlorinated polyolefins were of the solution type, dissolved in an organic solvent such as toluene, xylene, and/or esters. Thus, the organic solvents released into the atmosphere at the time of the coating operation gave a serious environmental and sanitary impact on coating workers and citizens living in a wide area around the coating place, and even on the surrounding ecosystem. Based on this situation, a patent application (WO9303104) has recently been made for an aqueous emulsion in which chlorinated polyolefins are blended with resins containing carboxylic acids. In these blend systems, however, a phase separation occurred between the different polymers after the formation of the coating film and the hydrophilic component, such as a surfactant came into the coating polymers, leading to the degraded strength and lowered water resistance of the coating film.

Considering what has been described above, the assignee of this patent has already completed the invention in which an aqueous emulsion is obtained by dissolving chlorinated polyolefins in monomers or oligomers and emulsifying the solution with a surfactant and then polymerizing (Japanese patent applications tokukaihei 5-209006, tokukaihei 5-287251, tokukaihei 6-287521, tokukaihei 8-176309). The object of these inventions was to increase the strength and water resistance of the coating film by copolymerization of chlorinated polyolefins with acrylic monomers to achieve the higher molecular weight. In order to achieve the polymerization as originally intended, however, the surfactant had to be selected from a narrow range and, in addition, it had to be used in a large amount. To improve the water resistance of the coating film from these chlorinated polyolefin-based resin emulsions, the use of water-soluble substances had to be further decreased.

The object of this invention is to achieve, without vapor-cleaning or defatting the surface of a polyolefin base material with chlorine-containing organic solvents such as trichloroethane, etc., a coating which has adhesiveness to a polyolefin base material and also has an improved interlayer adhesiveness to the base coat and/or the top coat and improved levels in properties such as water resistance, gasohol resistance, etc., and also which is less polluting or non-polluting.

SUMMARY OF THE INVENTION

In an attempt to solve the problem mentioned above, the inventors made a lot of effort to complete the invention. The first fruit of this invention is an aqueous, chlorinated polyolefin-based resin composition which is obtained by chlorinating, in a range of 5–50 wt. %, one or more kinds of polymers selected from polyolefins modified with the compounds (A), (B), and/or (C) below, and which has an acid value of 1–500 mg KOH/g:

(A) α,β-unsaturated carboxylic acids represented by any of c, d, and e in the general formula (1,) below,

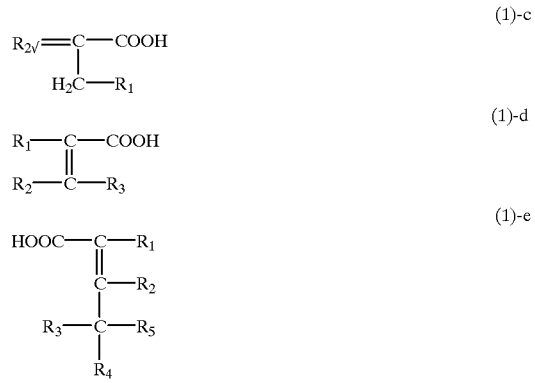

$R_1$, $R_2$, $R_3$, $R_4$ and $R_5$ are independently selected from the group consisting of
H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$ and COOH $R_{2v}$ is selected from the group consisting of:
$CH_2$, $C_2H_4$, $C_3H_6$, $C_4H_8$, $C_5H_{10}$, $C_6H_{12}$, $C_7H_{14}$, $C_8H_{16}$, $C_9H_{18}$, $C_{10}H_{20}$ CHCOOH, $C(CH_3)COOH$, $C(C_2H_5)COOH$, $C(C_3H_7)COOH$ and $C(C_4H_9)COOH$, (B) and/or acid anhydrides of the α,β-unsaturated carboxylic acids of (A) represented by either of a and b in the general formula (1) below,

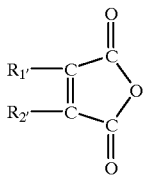

(1)-a $R_1'$ is selected from the group consisting of:
 H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$ and $C_{10}H_{21}$
$R_2'$ is selected from the group consisting of:
 H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$ and $C_{10}H_{21}$

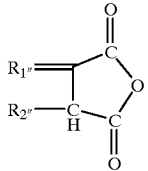

(1)-b $R_1''$ is selected from the group consisting of:
 $CH_2$, $C_2H_4$, $C_3H_6$, $C_4H_8$, $C_5H_{10}$, $C_6H_{12}$, $C_7H_{14}$, $C_8H_{16}$, $C_9H_{18}$, $C_{10}H_{20}$, CHCOOH, $C(CH_3)COOH$, $C(C_2H_5)COOH$, $C(C_3H_7)COOH$ and $C(C_4H_9)COOH$,
$R_2''$ is selected from the group consisting of:
 H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$ and $C_{10}H_{21}$ (C) and/or compounds having one or more double bonds in a molecule, represented by either of a and b in the general formula (2) below.

(2)-a $CH_2=C(R_1''')COOR_2'''$ $R_1'''$ is selected from the group consisting of:
 H and $CH_3$
$R_2'''$ is selected from the group consisting of:
 H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$, $C_{19}H_{39}$, $C_{20}H_{41}$, $C_2H_4OH$, $C_3H_6OH$, $C_4H_9OH$, $C_5H_{10}OH$, $C_6H_{12}OH$, $C_7H_{14}OH$, $-CH_2CH_2N(CH_3)_2$, $-CH_2CH_2N(CH_2CH_3)_2$, $-CH_2CH_2OCOCH_2CH_2COOH$, $-CH_2CH_2OCOC(CH_3)=CH_2$, $-(CH_2CH_2O)_2COC(CH_3)=CH_2$, $-C_4H_8COC(CH_3)=CH_2$, $C_6H_{12}OCOC(CH_3)=CH_2$, $-CH_2C(CH_2=C(R_1''')COOCH_2)_2CH_2CH_3$, $-CH_2CH(OH)CH_2OCOC(CH_3)=CH_2$, $(CH_2CH_2O)_xCOC(CH_3)=CH_2$; $1\leq X\leq 20$

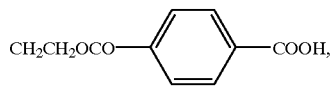

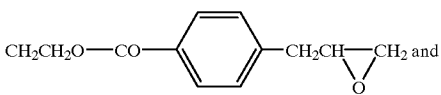

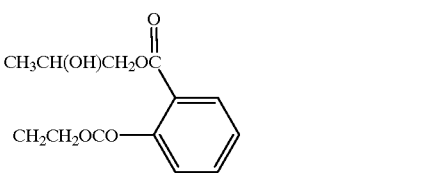

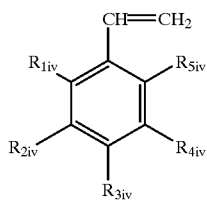

(2)-b $R_{1iv}$, $R_{2iv}$, $R_{3iv}$, $R_{4iv}$, and $R_{5iv}$ are independently selected from the group consisting of
 H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, and $C_{10}H_{21}$ The second fruit is the aqueous, chlorinated polyolefin based resin composition described above as the first fruit, to which, after the completion of the chlorination mentioned above, an epoxy compound or its oligomer is added so that the weight ratio of the compound having one epoxy group in a molecule and/or its oligomer to the aqueous, chlorinated polyolefin-based resin composition is 0.1:100–50:100.

The third fruit is the aqueous, chlorinated polyolefin-based resin composition described above as the second fruit, in which the chlorinated polyolefins obtained in the first fruit stage have polar groups introduced by further modification with the compounds
(A), (B), and (C) below in the solution system or in the heterogeneous dispersion system:
 (A) α,β-unsaturated carboxylic acids represented by any of c, d, and e in the general formula (1) above,
 (B) and/or acid anhydrides of the α,β-unsaturated carboxylic acids of (A), represented by either of a and b in the general formula (1) above,
 (C) and/or one or more kinds of compounds selected from the group consisting of compounds having one or more double bonds in a molecule, represented by either of a and b in the general formula (2) above.

The fourth fruit is the aqueous, chlorinated polyolefin-based resin composition described above as the first, second or third fruit, which contains, as the main constituents, α,β-unsaturated carboxylic acids represented by any of c, d, and e in the general formula (1) above and/or their acid anhydrides represented by either of a and b in the general formula (1) in an amount between 0.01 wt. % and 60 wt. %.

The fifth fruit is the aqueous, chlorinated polyolefin-based resin composition described above as the first, second, third or fourth fruit, which, in preparation of the aqueous, chlorinated polyolefin-based resin composition, contains, as the main constituents, compounds having one or more double bonds in a molecule, represented by either of a and b in the general formula (2) above in an amount between 0.01 wt. % and 60 wt. %.

The sixth fruit is a method for manufacture of an aqueous, chlorinated polyolefin-based resin composition in which during preparation of, or after preparation of the aqueous, chlorinated polyolefin-based resin composition described above as the first, second, third, fourth or fifth fruit, a polymer containing oxazoline is added in an amount between 0.01 wt % and 60 wt. %.

The seventh fruit is a method for manufacture of the emulsion of the aqueous, chlorinated polyolefin-based resin composition described above as the sixth fruit, in which during preparation of the aqueous, chlorinated polyolefin-based resin composition described as the first, second, third, fourth or fifth fruit, 0.01–20 wt. parts of an organic or inorganic basic substance is added per 100 wt. parts of chlorinated polyolefins or chlorinated polyolefins having polar groups introduced, to neutralize with the organic or inorganic basic substance the aqueous, chlorinated polyolefin-based resin composition so as to have a pH value in the range of 5–10.

The eighth fruit is a method for manufacture of the aqueous, chlorinated polyolefin-based resin composition described above as the sixth or seventh fruit, in which during preparation of the aqueous, chlorinated polyolefin-based resin composition described above as the first, second, third, fourth or fifth fruit, 0.01–100 wt. parts of a nonionic surfactant and/or an anionic or cationic surfactant are added for emulsification.

The ninth fruit is a method for manufacture of an aqueous, chlorinated polyolefin-based resin composition, in which during preparation of, or after-preparation of the aqueous, chlorinated polyolefin-based resin composition described above as the first, second, third, fourth, fifth, sixth, seventh or eighth fruit, an aqueous polyurethane-based resin having a hydroxyl group, a carboxyl group, and/or an isocyanate group in its molecule or having no functional group, or the emulsion of said aqueous polyurethane-based resin, is added in an amount between 0.01 wt. part and 2000 wt. parts.

The inventors have found that this invention gives a stable emulsion with the surfactant being present in a very small amount or without the surfactant. The surfactant amount, if any, being much smaller compared to cases in which other monomers are used, and that as a result the coating film has an excellent water resistance. Further, the inventors have found that the stability and compatibility are good also when an oxazoline-containing polymer and/or an aqueous polyurethane-based resin or its aqueous emulsion are added, and the properties of the coating film, such as water resistance, etc., are excellent.

The solubility parameter, SP value, of the α,β-unsaturated carboxylic acids, c, d, and e in the general formula (1) used in polymer (A) of this invention is preferably between 9.5 and 15.5. The SP value of the compounds having one or more double bonds in a molecule, a and b in the general formula (2) used in polymer (C) is preferably between 7.5 and 15.5. The solubility parameter, SP value, indicates the polarity of the compound, and can be calculated using the method by Fedors, based on the chemical composition of the monomers.

The method by Fedors for calculation of the SP value is shown below:

$$\text{SP value} = (\Delta H - RT^{1/2})N = (\Sigma e_i / \Sigma v_i)^{1/2},$$

where ΔH: heat of vaporization

V: molar volume (cm$^3$/mol)

$\Sigma e_i = \Delta H - RT$ (cal/mol)

$\Sigma v_i$: sum of each molar volume (cm$^3$/mol)

With the above information, the SP value can be calculated using $\Delta e_i$ and $\Delta vi$ given by Fedors.

In the synthesis of aqueous, chlorinated polyolefin-based resin compositions using this invention, polyolefins are modified so as to have a higher polarity with polar monomers having an SP value between 9.5 and 15.5 and/or polar monomers having an SP value between 7.5 and 15.5. After chlorination, the second stage modification for a further higher polarity may be applied, if necessary, using monomers having SP values in the same range as mentioned above. By this modification, the aqueous, chlorinated polyolefin-based resin composition can be synthesized without use of surfactants or with the use of surfactants in very small amounts. This invention relates to an aqueous, chlorinated polyolefin-based resin composition synthesized in such a way.

In manufacture of said aqueous chlorinated polyolefin-based resin composition using this invention, aqueous chlorinated polyolefin-based resin compositions which contain, as their constituents, α,β-unsaturated carboxylic acids and/or their acid anhydrides in an amount between 0.01 wt. % and 60 wt. %, and/or compounds having one or more double bonds in a molecule in an amount between 0.01 wt. % and 60 wt. %, are included. Besides, the addition of an organic or inorganic basic substance during the manufacture is effective in increasing greatly the stability of the emulsion of the aqueous, chlorinated polyolefin-based resin composition of this invention.

The use of the surfactant in the manufacturing process mentioned above not only increases remarkably the stability of the emulsion of the aqueous, chlorinated polyolefin-based resin composition, but also improves the secondary properties such as the properties of the coating film, compared to those in the case in which no surfactant is used, depending upon the molecular weight, molecular weight distribution, and chlorination degree of the chlorinated polyolefin used as a base, the kind and amount of the polar component contained, the kind and amount of the coexisting solvent, and the emulsifying conditions. Therefore, the kind and amount of the surfactant to be used are decided considering the molecular weight, molecular weight distribution, and chlorination degree of the chlorinated polyolefin used as a base, the kind and amount of the polar component contained, and the kind and amount of the coexisting solvent; one from the nonionic surfactant, the anionic one, and the cationic one, or a blend of the nonionic one and the anionic one, or that of the nonionic one and the cationic one is used. Compounding with an oxazoline-containing polymer during or after the synthesis is good for the emulsion of the aqueous, chlorinated polyolefin-based resin composition.

DETAILED DESCRIPTION OF THE INVENTION

The more detailed explanation of this invention will be given below, but the scope of the invention is not limited to what will be explained below. The polyolefin-based resin used in this invention includes, for example, polypropylene, ethylene-propylene copolymer, and ethylene-propylene-butene copolymer; also included are block copolymers and random copolymers of ethylene or propylene with other monomers such as butene, pentene, hexene, heptene, octene, nonene, etc. Also included are copolymers of two or more components selected from the monomers mentioned above and/or monomers other than ones mentioned above. These polymers are used solely or used in a blend of two or more kinds of them. It is known that there are stereoregular isomers in polypropylene homopolymers or propylene-based copolymers as listed below: (a) isotactic, (b) atactic, (c) syndiotactic, (d) hemi-isotactic, and (e) stereoblock.

Polypropylene moldings which need to have good mechanical properties, such as rigidity, impact strength, etc., or have good durability, are today made mainly of (a) isotactic polypropylene, the automobile bumper being its example. Thus, in order to achieve the object of this invention in coating those moldings, the emulsion of the aqueous, chlorinated polyolefin-based resin composition of this invention with an isotactic polymer, such as isotactic polypropylene, as a main component, is used. By doing so, good coating properties including adhesiveness are attained. On the other hand, the use of the emulsion of the aqueous, chlorinated polyolefin-based resin composition of this invention with an atactic polymer, such as (b) atactic polypropylene or a syndiotactic polymer, such as (c) syndiotactic polypropylene, as a main component, results in unsatisfactory adhesiveness or bad coating properties.

The weight-average molecular weight of these polymers used are in the range of 1,000–300,000; the more preferable molecular weight is between 5,000 and 100,000 as a weight-average molecular weight. The polymers having a weight-average molecular weight less than 1,000 cannot be used, because the coating film strength is lowered after chlorination or because coating film properties such as gasohol resistance, water resistance, etc. are lowered. The weight-average molecular weight higher than 300,000 is undesirable because of the viscosity increase in the modification and/or chlorination processes leads to difficulty in operation. Instead of using polyolefins as it is, they may be used after degradation by heat decomposition or by oxidation with an oxidizing agent such as oxygen, peroxides, etc., in solution in an appropriate solvent or not in solution. In order to achieve the object of the invention, the preferable crystallinity of the polyolefin used in this invention is between 20% and 70%. A crystallinity lower than 20% causes decrease in the coating film strength after chlorination or lowering in the coating film properties such as gasohol resistance, water resistance, etc. Besides the low crystallinity causes development of coating film tackiness leading to lowered coating film properties; thus such polyolefins cannot be used. In the case of the crystallinity higher than 70%, a lot of crystals remain in the coating polymer after chlorination, and the polymer is difficult to dissolve in an aromatic organic solvent such as toluene, leading to difficulty in the modification stage that follows.

The modification of polyolefins is carried out in a solution of an organic solvent such as toluene and xylene, using α,β-unsaturated carboxylic acids and/or their acid anhydrides and/or compounds having one or more double bonds in a molecule in the presence of a radical-generating agent. In another way, the modification is carried out in an autoclave or a single-shaft or two-or-more shaft extruder which can heat polyolefins to a temperature higher than their softening points or melting points and make them react in the molten state, using α,β-unsaturated carboxylic acids and/or their acid anhydrides and/or compounds having one or more double bonds in a molecule in the presence or absence of a radical-generating agent.

The following compounds are listed as a radical-generating agent for the modification reaction: peroxides such as di-tert-butyl perphthalate, tert-butyl hydroperoxide, dicumyl peroxide, benzoyl peroxide, tert-butyl peroxybenzoate, tert-butyl peroxyethylhexanoate, tert-butyl peroxypivalate, methyl ethyl ketone peroxide, di-tert-butyl peroxide, etc; azo nitriles such as azobisisobutyronitrile, azobisisopropionitrile, etc. In the graft copolymerization using these peroxides, the preferable amount of the peroxide is 0.1 wt. part–50 wt. parts per polyolefin, or more preferably 0.5 wt. part–30 wt. parts.

The α,β-unsaturated carboxylic acid and/or its acid anhydrides includes, for example, maleic acid, maleic anhydride, fumaric acid, citraconic acid, citraconic anhydride, mesaconic acid, itaconic acid, itaconic anhydride, aconitic acid, aconitic anhydride, etc. These monomers can be used solely, but the combined use of two or more kinds of them results often in better properties of the coating film.

The following compounds are listed as a compound having one or more double bonds in a molecule and being used in the modification reaction: monomers of the (meth) acrylic acid type such as (meth)acrylic acid, methyl(meth) acrylate, ethyl(meth)acrylate, propyl(meth)acrylate, butyl (meth)acrylate, 2-hydroxypropyl(meth)acrylate, 4-hydroxybutyl(meth)acrylate, cyclohexyl(meth)acrylate, tetrahydrofurfuryl(meth)acrylate, isoboryl(meth)acrylate, benzyl(meth)acrylate, 2-hydroxybutyl(meth)acrylate, (di) ethylene glycol di(meth)acrylate, 1,4-butanediol di(meth) acrylate, 1,6-hexanediol di(meth)acrylate, trimethylolpropane tri(meth)acrylate, glycerin di(meth)acrylate, 2-ethylhexyl(meth)acrylate, lauryl(meth)acrylate, stearyl (meth)acrylate, acrylamide, etc.; monomers of the styrene type such as styrene, α-methylstyrene, p-methylstyrene, chloromethylstyrene, etc. Besides the following monomers of the vinyl type can be used in combination with other monomers: divinylbenzene, vinyl acetate, vinyl ester of versatic acid, etc.

In the graft copolymerization with these monomers, one or more kinds of monomers are used. The use of two or more kinds of monomers is desirable. The preferable amount of the monomers used is between 0.1 wt. parts and 50 wt. parts per the polyolefin; or more preferably between 0.5 wt. parts and 30 wt. parts. The acid value of the modified polyolefin is preferably 1 KOH-mg/g–500 KOH-mg/g, or more preferably 5 KOH-mg/g–100 KOH-mg/g. When emulsified and neutralized, the polymer itself works as a surfactant if the acid value is appropriate. In the modification reaction, purging with nitrogen has to be done fully in the case of the reaction in the solution system using an organic solvent, for example toluene and/or xylene, and also in the case of the reaction in the heterogeneous dispersion system using a non-solvent, for example water.

The chlorinated polyolefin used in this invention can be prepared by a method already known to those skilled in the art. For example, a chlorinated polyolefin is prepared by allowing a polyolefin to react with chlorine blown in, the polyolefin being dissolved or dispersed in a solvent for chlorination, under ultraviolet irradiation or in the presence of a catalyst containing a peroxide, for example, benzoyl peroxide, under normal or elevated pressure at a temperature of 50–150° C.

For the chlorination product (referred to as modified chlorinated polyolefin hereafter) from a polyolefin modified with α,β-unsaturated carboxylic acids and/or their acid anhydrides and/or compounds having one or more double bonds in a molecule, all explained above for use in this invention, the degree of chlorination in the range of 5–50 wt. % is acceptable; preferably it is 10–40 wt. %. For the chlorination degree lower than 5%, the state of the solution becomes worse; for the chlorination degree higher than 50%, adhesiveness to polyolefin-based resins and solvent resistance are lowered.

The acid value of chlorinated polyolefins is in the range of 1 to 500, and preferably it is 10–400. The acid value less than 1 causes the solvent resistance to decrease; the acid value greater than 500 results in decrease in the interlayer adhesiveness to the base coat and/or the top coat. It is recommended, after completing chlorination, the modified chlorinated polyolefin is compounded with epoxy compounds or their oligomers for giving heat stability to the modified chlorinated polyolefin. In this invention, the preferable compounding weight ratio of a compound having one epoxy group in a molecule and/or its oligomer to the modified chlorinated polyolefin is 0.1:100–50:100. A compounding ratio less than 0.1 cannot give a sufficient stabilizing effect, and that greater than 50 lowers the adhesiveness to moldings and films of polyolefin-based resins.

The use of above-mentioned compounds having an epoxy group and/or their oligomers suppresses a crosslinking reaction caused during storage due to bifunctional epoxy compounds and acid anhydrides or organic acids. This is advantageous.

The preferable compound having one epoxy group in a molecule and/or its oligomer used in this invention is one having a good compatibility with chlorinated polyolefins. The following are examples of such compounds: phenyl glycidyl ether, 2-methylphenyl glycidyl ether, tert-butylphenyl glycidyl ether, 4-chlorophenyl glycidyl ether, 4-methoxyphenyl glycidyl ether, 2-biphenyl glycidyl ether, 1-naphthyl glycidyl ether, methyl glycidyl ether, isopropyl glycidyl ether, butyl glycidyl ether, tert-butyl glycidyl ether, 2-ethyl glycidyl ether. These can be used solely, but two or more of them, mixed together increase the effect.

As already mentioned, the object of this invention is to achieve the following using the aqueous, chlorinated polyolefin-based resin emulsion: (1) removing environmental pollution, (2) achieving an excellent adhesiveness to plastic materials such as a polyolefin base material, and (3) achieving a coating system having good coating film properties such as water resistance, gasohol resistance, etc. Further modification of the modified chlorinated polyolefins obtained above, with α,β-unsaturated carboxylic acids and/or their acid anhydrides and/or compounds having one or more double bonds in a molecule, in the solution system or in the heterogeneous dispersion system, is effective for achieving the object described above. The further modification increases further the polarity of the modified chlorinated polyolefin, and thus facilitates the realization of the object (1)–(3) mentioned above. The improvement in adhesiveness (2) checks penetration of water (moisture) or gasoline from outside the coating system, resulting in improved properties and increased durability of the coating film.

Surfactants used in this invention include: nonionic surfactants such as polyoxyethylene alkylphenyl ethers, polyoxyethylalkyls, polyoxyethylene alkylaryl ethers, polyethylenealkyl esters, sorbitan alkyl esters, polyoxyethylene sorbitan alkyl esters, poly(oxyethylene-oxypropylene) block copolymers, etc.; anionic surfactants such as higher alkyl sulfates, alkyl arylpolyoxyethylene ester-salts of sulfuric acid, higher fatty acid salts, alkylarylsulfonic acid salts, alkyl ester-salts of phosphoric acid, etc. As a cationic surfactant, amines with alkoxy groups can be used.

Emulsifiers of the polymer type or dispersing agents also can be used. The use of these can increase the viscosity in the system and contributes to stabilization. The typical ones which can contribute to the object of this invention are listed below: polymers such as gelatin, tragacanth gum, starch, methylcellulose, carboxymethyl cellulose, hydroxypropylcellulose, hydroxyethylcellulose, etc., and the derivatives of the polymers above; water-soluble organic polymers such as poly(vinyl alcohol), partially saponified poly(vinyl alcohol), ethylene-vinyl alcohol copolymer, ethylene-vinyl alcohol-vinyl acetate copolymer, poly(acrylic acid) salts, etc; dispersing agents such as barium sulfate, calcium sulfate, barium carbonate, calcium carbonate, magnesium carbonate, calcium phosphate, etc., which are water-insoluble inorganic compounds in the form of fine powder, or the mixture of the above compounds, inorganic substances such as talc, bentonite, silicic acid, diatomaceous earth, clay, etc., and metal oxide powders.

The anionic, nonionic, and cationic surfactants and the dispersing agents of the polymer type and of the inorganic type, listed above, can be used solely, but the combined use of two or more of them often improves the properties of the coating film. Reactive surfactants also can be used; the anionic and nonionic ones are commonly used; particularly preferable are ones having a polyoxyethylene group in the molecule as a hydrophilic group. An example of the preferable reactive surfactant is an adduct of alkylpropenyl(di) phenol poly(ethylene oxide) and/or its sulfuric acid ester-salt. The combination of a non-reactive surfactant and a reactive surfactant also can be used, and two or more kinds of surfactants for each of the types also can be used. The preferable amount of the surfactant above or their mixture to be used is 0.01–100 wt. parts for 100 wt. parts of the chlorinated polyolefin.

In order to obtain the objective emulsion, the modified chlorinated polyolefin has to be emulsified with water. This can be done without addition of surfactants, but, if added, emulsions having better properties can be obtained. An example of the emulsification procedure will be described below. An aqueous solution containing a specified amount of the surfactant is placed in a vessel equipped with an emulsifying device, for example a homomixer, and the modified chlorinated polyolefin is added slowly to be emulsified. The modified chlorinated polyolefin has to be dissolved in an organic solvent like toluene and/or xylene beforehand or at least has to be swelled or dispersed beforehand, so that the resin can be emulsified and dispersed well in the water. Otherwise, the agitating power would not be well transferred into the system and the desirable particle size could not be obtained. In this procedure, the organic solvent like toluene and/or xylene remains in the system, so the solvent has to be removed afterwards by concentration under reduced pressure. Of course, it is possible in the emulsification that the modified chlorinated polyolefin and its organic solvent are placed in the vessel first and then the aqueous solution of the surfactant and/or water are added.

The addition of a basic substance to the emulsion described above increases the stability of the emulsion, because the basic substance neutralizes the acid components introduced into the polymer and makes the acid components ionized, resulting in stretching of the polymer molecules and thus increasing the viscosity of the system. The pH of the system can be adjusted to a desirable level by adding basic substances. The basic substance to be used are as follows: organic basic substances such as (di)methylamine, (di) ethylamine, (di)propylamine, (di)butylamine, (di) hexylamine, (di)octylamine, (di)ethanolamine, (di) propanolamine, N-methyldiethanolamine, triethylamine, N,N-dimethylethanolamine, 2-dimethylamino-2-methyl-1-propanol, 2-amino-2-methyl-1-propanol, morpholine, etc.; inorganic basic substances such as aqueous ammonia, sodium hydroxide, potassium hydroxide, sodium carbonate, sodium hydrogencarbonate, ammonium carbonate, potassium carbonate, etc. These basic substances can be used solely, but the combination of two or more of them can achieve the object of this invention more effectively. The preferable amount of the basic substance used for neutralization is 0.1–10 wt. parts per the modified chlorinated polyolefin resin, depending upon how far the polyolefin has been modified.

As said before, the object of this invention is to achieve the following: (1) removing environmental pollution, (2) achieving an excellent adhesiveness to plastic materials such as the polyolefin base material, and (3) achieving a coating system having good coating film properties such as water resistance, gasohol resistance, etc. In pursuit of the third item above, the two-part curable emulsion which uses the oxazoline polymer is employed in this invention. What is called oxazoline polymer here is an aqueous crosslinking agent having the oxazoline group introduced into the polymer as a pendant group. The crosslinking agent is used to cross-link polymers having a carboxyl group and/or an acid anhydride group. It can form the crosslink when it is compounded at an appropriate compounding ratio and the coating film is baked or warmed. The oxazoline polymer is soluble or dispersible in water and has one or more oxazoline groups in its polymer molecule. Its main component polymer is of the (meth)acryl type, of the urethane type, and/or of the polyester type, etc.

The preferable compounding ratio of the oxazoline polymer to the modified chlorinated polyolefin is in the range of 1:300–300:1, and particularly preferably 1:60–5:1. The temperature for baking or warming after compounding and application onto the object to be coated, is preferably 70° C.–130° C., and more preferably 80° C.–120° C. A water-soluble weak acid, for example citric acid, may be added as a catalyst to promote the curing reaction.

In pursuit of the third item of the object of this invention, i.e., achieving a coating system good at coating film properties such as water resistance, gasohol resistance, the inventors have found that a certain system which, unlike the two-part curable type, does not include the curing reaction, can improve the properties of the coating film. For example, blending with an aqueous polyurethane-based resin or an aqueous polyurethane-based emulsion which has a good compatibility with the modified chlorinated polyolefin can be used. What is called here aqueous polyurethane-based resin or aqueous polyurethane-based emulsion is an aqueous resin or an aqueous emulsion whose base polymer consists mainly of polyurethane. What is called polyurethane here is a reaction product of a compound having the active hydrogen atom and a polyisocyanate, and can be obtained by the already known method, using a chain extender, a reaction-stopping agent and already known various additives as the need arises.

As the compound having the active hydrogen atom, high-molecular-weight polyols and polyamines are cited, for example. The high-molecular-weight polyols include polyetherpolyol, polyesterpolyol, (hydrogenated) polybutadienepolyol, polycarbonatediol, etc; the hydroxyl group equivalent of the high-molecular-weight polyol is generally 200–3,000. The preferable low-molecular-weight polyol includes (di)ethylene glycol, 1,4-butanediol, dimethylolpropionic acid, 3-methylpentanediol, 2-ethyl-1,3-hexanediol, etc. As the polyamine, cited are hexamethylenediamine, isophoronediamine, diethanolamine, N-hydroxyethylenediamine, 4,4'-diaminodicyclohexylmethane, etc. The sole use of the high molecular-weight polyol or the combination use of the high-molecular-weight polyol with the low-molecular-weight polyol and/or the polyamine is the usual manner of using these compounds having the active hydrogen atom. As for the polyisocyanate, a variety of already known aromatic, aliphatic, and alicyclic isocyanates can be used. For example, TDI (toluenediisocyanate), MDI (4,4'-diphenylmethanediisocyanate), HDI (hexamethylenediisocyanate), IPDI (isophoronediisocyanate), hydrogenated MDI, and tetramethylxylylenediisocyanate are cited.

In the manufacture of polyurethane resins, the quantitative proportion of polyisocyanate to the compound having the active hydrogen atom can be decided arbitrarily, but usually the proportion is in the range from 1:1 to 1:2 as a ratio in the equivalent. The number-average molecular weight of the polyurethane is usually 3,000–300,000. In this invention, polyurethane having the carboxyl group and/or the hydroxyl group and/or the isocyanate group in its molecule is particularly effective. There are various methods for making polyurethanes aqueous, and many of them are already known. For example, a polyurethane having sodium carboxylate or sodium sulfonate in the molecule is synthesized in the acetone/water system; then the acetone is distilled out. The introduction of a hydrophilic group into the molecule makes the polymer itself more hydrophilic, and the polymer can be well self-emulsified without using surfactants. What is called "an aqueous resin of the soap-free" type is mostly a resin like this. Thus the total amount of the surfactants in the system can be decreased if the aqueous, chlorinated polyolefin-based resin composition of this invention is blended with and/or is allowed to react with such polyurethane, and good coating film properties can be obtained if the compatibility between both the polymers is good.

The aqueous, chlorinated polyolefin-based resin composition of this invention which has been emulsified as described above, has not only good adhesiveness to plastic materials of low polarity like polyolefin base materials, but also has good coating film properties such as water resistance and gasohol resistance and also at the stability of the emulsion. In addition, the storability is also good. This emulsion can be applied to aqueous coating systems, aqueous adhesives, aqueous inks, etc. In the industrial practice of the aqueous coating like this, vaporization of water often becomes rate determining. However, the aqueous, chlorinated polyolefin-based resin emulsion of this invention is affinitive to water as a result of having its polarity increased, and in addition it is well miscible with film-forming auxiliaries or vaporization promoters of the alcoholic type and of other types, and it can also be stored for a long time in the practical situation. The typical film-forming auxiliaries or vaporization promoters which are preferably used in this invention are listed below: isopropyl alcohol, ethylene glycol, ethylene glycol monomethyl ether, ethylene glycol monobutyl ether, ethylene glycol monoethyl ether, ethylene glycol-2-ethylhexyl, propylene glycol, propylene glycol monomethyl ether, propylene glycol monobutyl ether, propylene glycol monoethyl ether, propylene glycol-2-ethylhexyl, diethylene glycol, diethylene glycol monomethyl ether, diethylene glycol monobutyl ether, diethylene glycol monoethyl ether, diethylene glycol-2-ethylhexyl, dipropylene glycol, dipropylene glycol monomethyl ether, dipropylene glycol monobutyl ether, dipropylene glycol monoethyl ether, and dipropylene glycol-2-ethylhexyl.

The use of one of these compounds or the combined use of two or more of them enables the full development of the various coating properties. 0.1–300 wt. parts or particularly preferably 0.5–100 wt. parts of these compounds are used for the aqueous, chlorinated polyolefin-based resin emulsion, being mixed with the emulsion. Besides the following additives can also be added to the aqueous, chlorinated polyolefin-based resin composition of this invention: organic and/or inorganic pigments and/or dyes, thickeners, antisagging agents, thixotropy agents, viscosity-adjusting agents, antifoamers, weatherizing agents, ultraviolet absorbers, antimolds, stabilizers, and other aqueous coatings and/or aqueous emulsions such as aqueous polyurethanes, aqueous acrylic resins, aqueous epoxy resins, aqueous amino resins, aqueous silicone resins, etc.

To further illustrate the present invention, and not by way of limitation, the following examples are given.

EXAMPLE 1

Two hundred eighty kilograms of isotactic polypropylene (Mw=about 30,000), 5.0 g of acrylic acid, 16.8 g of maleic anhydride, 5.6 g of dicumyl peroxide and 420 g of toluene were added in an autoclave equipped with a stirrer. After 5-minute displacement of the air with nitrogen, the mixture was allowed to react at 140° C. for 5 hours with heating and stirring. (Hereafter, this step is referred as Graft Polymerization 1). After the reaction completed, the reaction mixture was put into a large amount of methyl ethyl ketone to precipitate a resin. The resultant resin was then washed several times with methyl ethyl ketone to remove unreacted monomers, and dried fully at 60° C. under reduced pressure of 10 torr. One hundred grams of the resultant acid-modified resin and 900 g of tetrachloroethylene were added in a four-neck flask. After about five-minute displacement of the air with nitrogen, the resin was heated to 110° C. and fully dissolved. One gram of di-tert-butyl peroxide was then added and gaseous chlorine was bubbled. After 3-hour bubbling with 63 g of gaseous chlorine, nitrogen gas was bubbled to remove unreacted gaseous chlorine and hydrochloride. After the solvent, tetrachloroethylene, was evaporated with an evaporator, toluene was added alternatively to obtain 20wt % solution in toluene of acid-modified, chlorinated polyolefin (Acid Value=50 mg KOH/g; Chlorine content=22.2 wt %; and Mw=25,000). Denacol EX-141 (phenyl glycidyl ether, an epoxy compound with an epoxy equivalent of 154, available from Nagase Kasei Kogyo Co. Ltd.) was added to the resultant composition, i.e., the above-described 20 wt % solution in toluene, in an amount of 4 wt % based on the resin, and stirred fully.

One hundred grams of the above-described 20.6 wt % solution in toluene was put in a flask. Separately, 1.0 g of Neocol P (an anionic surfactant available from Daiichi Kogyo Seiyaku Co. Ltd.) and 1.0 g of Neugen EA-190D (a non-ionic surfactant available from Daiichi Kogyo Seiyaku Co. Ltd.) were put in another flask. One-hundred grams of deionized water was then added in the flask to dissolve the mixture fully at 50° C. The solution in toluene and the surfactant solution were combined and stirred in an emulsifier at 20,000 rpm for 5 minutes to obtain a pre-emulsion. The particle size determination for the pre-emulsion showed a 50% particle size of 0.22 μm with a degree of dispersion of 1.0; where, the degree of dispersion is given by the following equation, Degree of dispersion=(90% particle size)*(10% particle size)/(50% particle size).

The pre-emulsion was adjusted to pH 8 with 25% aqueous ammonium and then put in a one-liter evaporation flask with 50 g of deionized water. Toluene in the system was evaporated under reduced pressure of 100–200 torr with an evaporator while the temperature of the pre-emulsion was maintained at 45° C. The remaining portion was cooled to 25° C., filtered through a #400-mesh metal strainer to remove trace amounts of emulsified materials and undissolved matters with a diameter of about fifty micrometers or more. This gave an emulsion of an aqueous, chlorinated polyolefin resin having a pH value of 7.8, a solid content of 20.2 wt %, a 50% particle size of 0.24 μm with a degree of dispersion of 1.1, and no residual toluene.

EXAMPLE 2

Two hundred eighty kilograms of isotactic polypropylene (Mw=50,000), 6.8 g of maleic anhydride, 5.6 g of dicumyl peroxide and 420 g of toluene were added in an autoclave equipped with a stirrer. After 5-minute displacement of the air with nitrogen, the mixture was allowed to react at 140° C. for 5 hours with heating and stirring. After the reaction completed, the reaction mixture was put into a large amount of acetone to precipitate a resin. The resultant resin was then washed several times with acetone to remove unreacted monomers, and dried fully at 60° C. under reduced pressure of 10 torr. One hundred grams of the resultant acid-modified resin and 1,000 g of tetrachloroethylene were added in a four-neck flask. After about five-minute displacement of the air with nitrogen, the resin was heated to 110° C. and fully dissolved. One gram of di-tert-butyl peroxide was then added and gaseous chlorine was bubbled. After 3-hour bubbling of 80 g of gaseous chlorine, nitrogen gas was bubbled to remove unreacted gaseous chlorine and hydrochloride. After the solvent, tetrachloroethylene, was evaporated with an evaporator, toluene was added alternatively to obtain a 20 wt % solution in toluene of acid-modified chlorinated polypropylene (Acid value=60 mg KOH/g; chlorine content=24.1 wt %; and Mw=48,000). Denacol EX-141 (phenyl glycidyl ether available from Nagase Kasei Kogyo Co. Ltd.) was added to the resultant composition, i.e. the 20 wt % solution in toluene, in an amount of 4 wt % based on the resin, and stirred fully.

The above-described 20.5 wt % solution in toluene was transferred into a flask equipped with a stirrer, a dropping funnel, a condenser, a thermometer and a nitrogen introduction tube. One gram of benzoyl peroxide, 2.5 g of methacrylic acid and a previously well-dissolved mixture of 1.5 g of 2-ethylhexyl methacrylate and 10 g of toluene were added in the funnel. After about a five-minute displacement of the air with nitrogen, the mixture in the flask was heated to 90° C. and then the contents in the funnel were dropped into it at a constant rate over 3 hours with heating and stirring. The reaction mixture was then allowed to react for 5 hours at 90° C. (Hereafter, this reaction is referred as Graft Polymerization 2.) The resultant reaction mixture was diluted with toluene to prepare a 20 wt % solution. Separately, 2 g of Neugen EA-190D (a nonionic surfactant available from Daiichi Kogyo Seiyaku) was put in another flask, and 100 g of deionized water was then added to dissolve fully at 50° C. The above-described solution in toluene and the surfactant solution were combined and stirred in an emulsifier at 20,000 rpm for 5 minutes to obtain a pre-emulsion. The particle size determination for the pre-emulsion showed a 50% particle size of 0.22 μm with a degree of dispersion of 1.3. The pre-emulsion was adjusted to pH 9 with morpholine and then put in a one-liter evaporation flask with 50 g of deionized water to evaporate toluene under reduced pressure, as described in Example 1. The resultant mixture was cooled to 25° C. and filtered through a #400-mesh metal strainer to remove trace amounts of unemulsified and undissolved matters with a size of about fifty micrometers or more. This gave an emulsion of an aqueous, chlorinated polyolefin resin having a pH value of 8.5, a solid content of 19.8 wt %, a 50% particle size of 0.19 μm with a degree of dispersion of 0.9, and no residual toluene.

EXAMPLES 3–15

Emulsions in water of chlorinated polyolefin were prepared in the same way as described in Example 1 or 2, except that the components and their amount shown in Table 1 were used for Graft Polymerization 1 or 2.

COMPARATIVE EXAMPLES 1–5

Emulsions of aqueous, chlorinated polyolefin resins were synthesized in the same way as described in Example 1 or 2, except that the components and their amount shown in Table 1 were used. The following physical properties of the resultant emulsions were measured. The results are shown in Table 3.

MA=maleic acid; AAH=aconitic anhydride; AcA=acrylic acid; MAcA=methacrylic acid; HEMA=2-hydroxyethyl methacrylate; MAcEH=2-ethylhexyl methacrylate; and MMA=methyl methacrylate.
Organic solvents: T=toluene and X=xylene.
Peroxides: DC=dicumyl peroxide; DBP=di-tert-butyl peroxide; BPO=benzoyl peroxide; AIBN=azo-bis-isobutylonitrile; LPO=lauroyl peroxide; and BPEH=t-butylperoxy-2-ethylxexanoate.
Surfactants: ① lpolyoxyethylene nonylphenyl ether (HLB=19.0); ② sodium dialkyl sulfosuccinate; ③ sodium lauryl sulfate; ④ sodium polyoxyethylene lauryl ether sulfate; ⑤ polyoxyethylene lauryl ether; ⑥ polyoxyethylene nonylphenyl ether (HLB=15.5); ⑦ polyoxyethylene sorbitan monolaurate (HLB=14.9); ⑧ polyethyleneglycol monolaurate (HLB=18.3); ⑨ lauryl trimethyl ammonium chloride; ⑩ polyoxyethylene alkyl amine; ⑪ partially saponified polyvinylalcohol (degree of saponification=87%).

TABLE 1

| | Graft Polymerization 1 | | | | | | | |
|---|---|---|---|---|---|---|---|---|
| | Raw Material Polyolefin | | | Monomer A | | Monomer B | | Organic Solvent | Peroxide | Chlorination |
| Example No. | Polyolefin | Molecular Weight | Amount | Polyolefin (in grams) | SP Value | Polyolefin (in grams) | SP Value | Type (in grams) | Type (in grams) | Degree of chlorination |
| 1 | IPP | 30000 | 280 g | AcA (5.0) | 12.3 | MAH (16.8) | 17.9 | T (420) | DC (5.6) | 22.2% |
| 2 | IPP | 50000 | 280 g | MAH (16.8) | 17.9 | — | — | T (420) | DC (5.6) | 24.1% |
| 3 | IPP | 15000 | 280 g | MAH (15.0) | 17.9 | CAH (6.5) | 14.9 | X (350) | DBP (3.0) | 19.6% |
| 4 | IPP | 60000 | 280 g | MAH (15.0) | 17.9 | CAH (6.5) | 14.9 | T (600) | DC (6.3) | 20.8% |
| 5 | PB | 120000 | 280 g | MAH (15.0) | 17.9 | CAH (6.5) | 14.9 | T (600) | DC (6.3) | 18.3% |
| 6 | PB | 120000 | 280 g | MAcA (7.0) | 10.7 | MAH (6.8) | 17.9 | T (600) | DBP (3.8) | 15.8% |
| 7 | PB | 70000 | 280 g | MAcA (7.0) | 10.7 | MAH (6.8) | 17.9 | T (600) | DBP (3.8) | 19.6% |
| 8 | PB | 70000 | 280 g | MAcA (7.0) | 10.7 | MA (0.5) | 16.4 | T (600) | DC (6.8) | 22.1% |
| 9 | PB | 40000 | 280 g | IAH (2.3) | 15.3 | HEMA (3.0) | 13.5 | X (300) | DC (6.8) | 16.3% |
| 10 | EPB | 80000 | 280 g | IAH (2.3) | 15.3 | HEMA (3.0) | 13.5 | T (500) | DBP (2.8) | 17.8% |
| 11 | EPB | 80000 | 280 g | IAH (2.3) | 15.3 | HEMA (3.0) | 13.5 | T (500) | DEP (2.8) | 21.8% |
| 12 | EPB | 80000 | 280 g | MAH (8.5) | 17.9 | — | — | T (500) | DC (8.8) | 26.3% |
| 13 | EPB | 80000 | 280 g | MAH (8.5) | 17.9 | — | — | T (500) | DC (8.8) | 18.8% |
| 14 | EPB | 80000 | 280 g | MAH (10.0) | 17.9 | St (2.0) | 10.6 | X (600) | DC (8.8) | 17.5% |
| 15 | EPB | 80000 | 280 g | MAH (10.0) | 17.9 | St (2.0) | 10.6 | X (600) | DC (8.8) | 20.6% |
| Compar. 1 | IPP | 30000 | 280 g | — | — | — | — | T (420) | DC (5.6) | 22.2% |
| Compar. 2 | IPP | 50000 | 280 g | — | — | — | — | T (420) | DC (5.6) | 24.1% |
| Compar. 3 | IPP | 15000 | 280 g | — | — | — | — | X (350) | DBP (3.0) | 19.6% |
| Compar. 4 | IPP | 60000 | 280 g | — | — | — | — | T (600) | DC (5.6) | 20.8% |
| Compar. 5 | EPB | 80000 | 280 g | — | — | — | — | T (500) | DC (5.6) | 17.8% |

| | Graft Polymerization 2 | | | | | Preparation of Water-based Emulsion | |
|---|---|---|---|---|---|---|---|
| Example No. | Monomer A Polyolefin (in grams) | SP Value | Monomer B Polyolefin (in grams) | SP Value | Peroxide Type (in grams) | Surfactant (Amount in grams) | Base |
| 1 | — | — | — | — | — | ① ② (each 1) | aqueous ammonia |
| 2 | MAcA (2.5) | 10.7 | MAcEH (1.5) | 9.0 | BPO (1.0) | ① (2.0) | morpholine |
| 3 | MAcA (3.0) | 10.7 | MMA (2.2) | 9.9 | AIBN (0.5) | ① (1.0) | AMP |
| 4 | MAcA (5.0) | 10.7 | — | — | AIBN (0.5) | ③ (0.5) | TEA |
| 5 | MAH (0.5) | 17.9 | — | — | AIBN (0.5) | ④ (1.5) | TEO |
| 6 | MAH (0.5) | 17.9 | MAcEH (2.5) | 9.0 | BPO (1.5) | — | DEA |
| 7 | ACA (1.5) | 12.3 | MAH, MMA (1.0 each) | 17.9/9.9 | BPO (1.5) | ⑤ (0.2) | NaC |
| 8 | ACA (1.5) | 12.3 | MAH, MMA (1.0 each) | 17.9/9.9 | BPO (1.5) | ⑥ (0.8) | DPA |
| 9 | MAH (0.5) | 17.9 | MAcA (1.0) | 10.7 | LPO (1.5) | ⑥ ⑦ (each 0.5) | — |
| 10 | MAH (0.5) | 17.9 | MAcA (1.0) | 10.7 | LPO (1.5) | ⑧ (0.3) | DHA |
| 11 | MAH (0.5) | 17.9 | AcA (2.0) | 12.3 | LPO (1.5) | ⑨ (2.5) | DBA |
| 12 | MAH (0.5) | 17.9 | AcA (2.0) | 12.3 | BPEH (0.5) | ③ ⑤ (each 1) | — |
| 13 | AAH (0.5) | 17.3 | AcA (2.0) | 12.3 | BPEH (0.5) | ⑦ ⑪ (each 1) | — |
| 14 | AAH (0.5) | 17.3 | AcA (2.0) | 12.3 | BPEH (0.5) | ⑩ (2.0) | AMP |
| 15 | IA (0.5) | 15.1 | AcA (2.0) | 12.3 | BPEH (0.5) | ⑩ ⑪ (each 1) | TEA |
| Compar. 1 | — | 10.7 g | MAcEH (1.5) | 9.0 | BPO (1.0) | ① ② (each 1) | — |
| Compar. 2 | — | — | — | — | — | ① (2.0) | |
| Compar. 3 | — | 10.7 g | MAcEH (1.5) | 9.0 | BPO (1.0) | ① (1.0) | AMP |
| Compar. 4 | — | — | — | — | — | ③ (0.5) | TEA |
| Compar. 5 | — | 10.7 g | MAcEH (1.5) | 9.0 | BPO (1.0) | ④ (1.5) | TEO |

Abbreviations: Polyolefins: IPP=isotactic polypropylene; PB=propylene-butene copolymer (containing 76mol % propylene); EPB=ethylene-propylene-butene terpolymer (containing 20mol % propylene).
Molecular weight: Weight-average molecular weight.
Monomers: MAH=maleic anhydride; IAH=itaconic anhydride; CAH=citraconic anhydride; IA=itaconic acid;

Bases: AMP=2-methyl-2-amino-1-propanol; TEA=triethylamine; TEO=triethanolamine; DEA=diethylamine; NaC=sodium carbonate; DPA=dipropylamine; DHA=dihexylamine; DBA=dibutylamine.

EXAMPLE 16

One hundred grams of the emulsion of the aqueous, chlorinated polyolefin resin (20.2% resin solids) obtained in Example 1 and 100 g of NeoRez R972 (an aqueous urethane resin containing 20% resin solids, available from Zeneca Co. Ltd.) were mixed well. 4.9 g of EpoCross WS-500 (an oxazoline-group containing, water-soluble polymer containing 40% resin solids, available from Nihon Shokubai Co. Ltd.) was added to the mixture and stirred well to prepare a resin blend composition consisting of the emulsion of the aqueous, chlorinated polyolefin resin, the aqueous urethane resin, and the oxazoline-group containing, water-soluble polymer.

EXAMPLES 17–30

Resin blend compositions were prepared in the same way as described in Example 16, except that the composition shown in Table 2-1 was used to blend an aqueous urethane resin and/or an acrylic emulsion and an oxazoline-group containing, water-soluble polymer.

EXAMPLE 31

One hundred grams of the emulsion of the aqueous, chlorinated polyolefin resin (20.2% resin solids) obtained in Example 1 and 100 g of NeoRez R972 (an aqueous urethane resin adjusted to 20 wt % resin solids, available from Zeneca Co. Ltd.) were mixed well and then 15.58 of NeoRez 990 (an aqueous, isocyanate block containing urethane having 35 wt % resin solids, available from Zeneca Co. Ltd.) was added. The mixture was stirred well to prepare a resin composition consisting of the emulsion of the aqueous, chlorinated polyolefin resin, the aqueous urethane resin and the aqueous urethane resin containing blocks of isocyanate groups.

COMPARATIVE EXAMPLES 6–10

Resin blend compositions were prepared in the same way as described in Example 16, except that an oxazoline-group containing polymer was used according to the composition shown in Table 2-2.

COMPARATIVE EXAMPLE 11

A resin blend composition was prepared in the same way as described in Example 31, except that an aqueous, isocyanate block containing urethane was included according to the compositions shown in Table 2-2.

The coating characteristics and emulsion characteristics for the polymer or composition of Examples 1–31 of this invention are shown in Table 3-1.

The coating characteristics and emulsion characteristics for the polymers or compositions of the comparative examples are shown in Table 3-2.

TABLE 2-1

| Example No. | Water-based emulsion of modified chlorinated polyolefin[1)] | | Aqueous resin[2)] | | Oxazoline-group containing polymer[3)] | Aqueous, Isocyanate block containing urethane |
|---|---|---|---|---|---|---|
| | Content | Amount | Content | Amount | Amount | Amount |
| 16 | Example 1 | 100 g | NeoRez 972 | 100 g | 4.9 g | — |
| 17 | Example 2 | 100 g | VTW1232 | 50 | 7.8 | — |
| 18 | Example 3 | 100 g | VTW1232 | 100 | 12.2 | — |
| 19 | Example 4 | 100 g | VTW2275 | 50 | 8.3 | — |
| 20 | Example 5 | 100 g | VTW2275 | 100 | 26.5 | — |
| 21 | Example 6 | 100 g | NeoRez 972 | 100 | 4.8 | — |
| 22 | Example 7 | 100 g | NeoRez 984 | 200 | 7.8 | — |
| 23 | Example 8 | 100 g | NeoRez 9603 | 100 | 6.8 | — |
| 24 | Example 9 | 100 g | NeoRez 9621 | 200 | 8.8 | — |
| 25 | Example 10 | 100 g | NeoRez 9620 | 50 | 9.1 | — |
| 26 | Example 11 | 100 g | NeoCryl A1070 | 200 | 6.5 | — |
| 27 | Example 12 | 100 g | NeoCryl A6075 | 100 | 3.9 | — |
| 28 | Example 13 | 100 g | NeoCryl XK-90 | 200 | 9.5 | — |
| 29 | Example 14 | 100 g | NeoCryl XK-90 | 50 | 4.2 | — |
| 30 | Example 15 | 100 g | — | — | 3.4 | — |
| 31 | Example 1 | 100 g | NeoRezR-972 | 100 | — | 15.5 g |

TABLE 2-2

| Comparative Example No. | Water-based emulsion of modified chlorinated polyolefin | | Aqueous resin[2)] | | Oxazoline-group containing polymer[3)] | Aqueous, Isocyanate block containing urethane |
|---|---|---|---|---|---|---|
| | Content | Amount | Content | Amount | Amount | Amount |
| 6 | Comp. Ex. 1 | 100 g | NeoRez 972 | 100 g | 4.9 g | |
| 7 | Comp. Ex. 2 | 100 g | VTW1232 | 50 | 7.8 | |
| 8 | Comp. Ex. 3 | 100 g | VTW1232 | 100 | 12.2 | |
| 9 | Comp. Ex. 4 | 100 g | VTW2275 | 50 | 8.3 | |

TABLE 2-2-continued

| Comparative Example No. | Water-based emulsion of modified chlorinated polyolefin Content | Amount | Aqueous resin[2] Content | Amount | Oxazoline-group containing polymer[3] Amount | Aqueous, Isocyanate block containing urethane Amount |
|---|---|---|---|---|---|---|
| 10 | Comp. Ex. 5 | 100 g | VTW2275 | 100 | 26.5 | |
| 11 | Comp. Ex. 1 | 100 g | NeoRez 972 | 100 | — | 15.5 g |

[1]20 ± 1 wt % resin solids.
[2]Daotan VTW1232 and Daotan VTW2275 were urethane emulsions available from Hoechst Co.; NeoRez 972, NeoRez 984, NeoRez 9603, NeoRez 9621 and NeoRez 9320 were aqueous urethanes adjusted to 20 wt % resin solids with water, available from Zeneca Co., Ltd.; NeoCryl A107, NeoCryl A6075 and NeoCryl XK-90 were aqueous acrylurethanes adjusted to 20 wt % resin solids with water, available from Zeneca Co. Ltd.
[3]EpoCross WS500, containing 40 wt % resin solids, was available from Nihon Shokubai Co. Ltd.

TABLE 3-1

| Example No. | Coating Film Characteristics | | | Emulsion Characteristics | | | |
|---|---|---|---|---|---|---|---|
| | Adhesion | Moisture resistance | Gasohol resistance | High-temperature stability | Low-temperature stability | Grain | Dilution stability |
| 1 | 25/25 | ○ (25/25) | ○ | ○ | ○ | ○ | ○ |
| 2 | 25/25 | ○ (25/25) | ○ | ○ | ○ | ○ | ○ |
| 3 | 25/25 | ○ (25/25) | ○ | ○ | ○ | ○ | ○ |
| 4 | 25/25 | ○ (25/25) | ○ | ○ | ○ | ○ | ○ |
| 5 | 25/25 | ○ (25/25) | ○ | ○ | ○ | ○ | ○ |
| 6 | 25/25 | ○ (25/25) | ○ | ○ | ○ | ○ | ○ |
| 7 | 25/25 | ○ (25/25) | ○ | ○ | ○ | ○ | ○ |
| 8 | 25/25 | ○ (25/25) | ○ | ○ | ○ | ○ | ○ |
| 9 | 25/25 | ○ (25/25) | ○ | ○ | ○ | ○ | ○ |
| 10 | 25/25 | ○ (25/25) | ○ | ○ | ○ | ○ | ○ |
| 11 | 25/25 | ○ (25/25) | ○ | ○ | ○ | ○ | ○ |
| 12 | 25/25 | ○ (25/25) | ○ | ○ | ○ | ○ | ○ |
| 13 | 25/25 | ○ (25/25) | ○ | ○ | ○ | ○ | ○ |
| 14 | 25/25 | ○ (25/25) | ○ | ○ | ○ | ○ | ○ |
| 15 | 25/25 | ○ (25/25) | ○ | ○ | ○ | ○ | ○ |
| 16 | 25/25 | ○ (25/25) | ○ | ○ | ○ | ○ | ○ |
| 17 | 25/25 | ○ (25/25) | ○ | ○ | ○ | ○ | ○ |
| 18 | 25/25 | ○ (25/25) | ○ | ○ | ○ | ○ | ○ |
| 19 | 25/25 | ○ (25/25) | ○ | ○ | ○ | ○ | ○ |
| 20 | 25/25 | ○ (25/25) | ○ | ○ | ○ | ○ | ○ |
| 21 | 25/25 | ○ (25/25) | ○ | ○ | ○ | ○ | ○ |
| 22 | 25/25 | ○ (25/25) | ○ | ○ | ○ | ○ | ○ |
| 23 | 25/25 | ○ (25/25) | ○ | ○ | ○ | ○ | ○ |
| 24 | 25/25 | ○ (25/25) | ○ | ○ | ○ | ○ | ○ |
| 25 | 25/25 | ○ (25/25) | ○ | ○ | ○ | ○ | ○ |
| 26 | 25/25 | ○ (25/25) | ○ | ○ | ○ | ○ | ○ |
| 27 | 25/25 | ○ (25/25) | ○ | ○ | ○ | ○ | ○ |
| 28 | 25/25 | ○ (25/25) | ○ | ○ | ○ | ○ | ○ |
| 29 | 25/25 | ○ (25/25) | ○ | ○ | ○ | ○ | ○ |
| 30 | 25/25 | ○ (25/25) | ○ | ○ | ○ | ○ | ○ |
| 31 | 25/25 | ○ (25/25) | ○ | ○ | ○ | ○ | ○ |

TABLE 3-2

| Comparative Example No. | Coating Film Characteristics | | | Emulsion Characteristics | | | |
|---|---|---|---|---|---|---|---|
| | Adhesion | Moisture Resistance | Gasohol Resistance | High-temperature Stability | Low-temperature Stability | Grain | Dilution Stability |
| 1 | 2/25 | X (0/25) | X | X | X | X | X |
| 2 | 0/25 | X (0/25) | X | X | X | X | X |
| 3 | 1/25 | X (0/25) | X | X | X | X | X |
| 4 | 2/25 | X (0/25) | X | X | X | X | X |
| 5 | 5/25 | X (0/25) | X | X | X | X | X |
| 6 | 2/25 | X (0/25) | X | X | X | X | X |
| 7 | 0/25 | X (0/25) | X | X | X | X | X |
| 8 | 2/25 | X (0/25) | X | X | X | X | X |
| 9 | 0/25 | X (0/25) | X | X | X | X | X |

TABLE 3-2-continued

| Comparative Example No. | Coating Film Characteristics | | | Emulsion Characteristics | | | |
|---|---|---|---|---|---|---|---|
| | Adhesion | Moisture Resistance | Gasohol Resistance | High-temperature Stability | Low-temperature Stability | Grain | Dilution Stability |
| 10 | 0/25 | X (0/25) | X | X | X | X | X |
| 11 | 2/25 | X (0/25) | X | X | X | X | X |

(1) Adhesion: The surface of polypropylene plates (made by forming Mitsui Noblene SB-E3 under pressure into 100 mm×50 mm size and 2 mm thickness according to a predetermined method) was cleaned with isopropyl alcohol and coated with each of the compositions obtained in Examples 1 to 12 and Comparative Examples 1 to 5 with an air spray gun (F-88 type available from Meiji Kikai Seisakusho Co. Ltd.). The plates were dried at 80° C. for 30 minutes and allowed to cool at room temperature. The base agent and curing agent of a two-part urethane paint (Rethane PG-80 available from Kansai Paint Co. Ltd.) were mixed at a weight ratio of 100:25. After a thinner was then mixed so that the coating amount could be 50–60 g/m$^2$, the mixture was applied onto the plate surface with an air spray gun. The plates were then dried at 120° C. for 30 minutes and allowed to cool to room temperature and to stand for 24 hours for subsequent testing. The plates were evaluated in the following procedure: On the surface of each plate, grooves reaching the plate itself were made to prepare 25 lattices. A cellophane adhesive tape was applied onto the lattices and then peeled at a right angle to the coating surface. The number of lattices remained was counted.

(2) Moisture resistance: Polypropylene plates were coated in the same way as described in (1). After the plates were dipped in portable water maintained at 40° C. for 240 hours, the appearance of the coatings on one side of the coated pieces was investigated. At the same time, the plates were was evaluated for adhesion in the same way as described in (1).

(3) Gasohol resistance: Polypropylene plates were coated in the same way as described in (1). After the plates were dipped in gasohol (a 90 wt %:10 wt % mixture of regular gasoline and ethanol) maintained at 20° C. for 10 minutes, the condition of the coatings thereon was investigated.

(4) High-temperature stability of emulsion: The 50% particle size of the water-based compositions with a resin content of 20 wt % was determined before and after they were allowed to stand for 6 months in a thermostat at 40° C. The ratio of the size before treatment to that after treatment, i.e., (50% particle size after 6 months)/(50% particle size immediately after production), was calculated. (O=0.9–1.1; Δ=1.2–2.0; and X=2 or more.)

(5) Low-temperature stability of emulsion: The 50% particle size of the water-based compositions with a resin content of 20 wt % was determined before and after they were allowed to stand for 1 month in a thermostat at 40° C. The ratio of the size before treatment to that after treatment, i.e., (50% particle size after 6 months)/(50% particle size immediately after production), was calculated. (O=0.9–1.1; Δ=1.2–2.0; and X=2 or more.)

(6) Grain (s): The water-based compositions with a resin content of 20 wt % were allowed to stand for 1 month in a thermostat at 40° C. The resultant compositions were investigated with a grain gauge tester (available from Taiyu Kizai Co. Ltd.) according to JIS K5400. (O means that the composition contained no grain with a diameter of 40 μm or more and less than 5 grains with a diameter of less than 40 μm; Δ means that the composition contained at least one grain with a diameter of 40 μm or more and at least 5 grains with a diameter of less than 40 μm; and X means that the composition contained at least one grain with a diameter of 40 μm or more and at least 5 grains with a diameter of less than 40 μm.)

(7) Stability upon propylene glycol dilution: Twenty grams of propylene glycol was added gradually to each of the water-based compositions with a resin content of 20 wt % with stirring in a thermostat at 25° C. to prepare a homogeneous blend. The resultant blends were allowed to stand therein for 1 month. At the end of the storage period, each blend was taken from the thermostat to investigate the appearance and particle size. The ratio of the size before treatment to that after treatment, i.e., (50% particle size after 1 month)/(50% particle size immediately after production), was calculated. (O=0.9–1.1; Δ=1.2–2.0; and X=2 or more.)

Effects of the Present Invention

The water-based emulsion of the aqueous, chlorinated polyolefin resin composition according to the present invention is excellent in adhesion to molded plastic products or films containing a polyolefin, such as polypropylene, and having a low-polarity surface. It is also excellent in other coating characteristics, such as moisture resistance and gasohol resistance, and in emulsion stability. In addition, it is excellent not only in compatibility with oxazoline-group containing polymers, curing agents, such as aqueous, isocyanate block containing urethanes, or other aqueous resins, but also in stability upon the addition of a film-forming co-agent, such as propylene glycol monomethyl ether, or an evaporation facilitating co-agent is added, and during storage. Therefore, the emulsion according to the present invention can provide a better coating film than the water-based compositions of the prior art used for paints and primers therefor as well as coatings containing adhesives and primers therefor for molded plastic products or films containing polyolefin, such as polypropylene, and having a low-polarity surface. In addition, the emulsion of the present invention is remarkably excellent from the viewpoint of environmental protection, safety and health, because it contains no organic solvent including aromatic solvents, such as toluene and xylene.

What is claimed is:

1. An aqueous, chlorinated polyolefin-based resin composition, which has an acid value of 1–500 mg KOH/g, and is obtained by chlorination in the range of 5–50 wt % of one or more polyolefins which are modified with at least one of the following compounds A, B and/or C:

(A) an α,β-unsaturated carboxylic acid represented by any one of general formulas 1(c), 1(d) and/or 1(e)

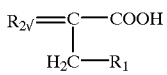
(1)-c

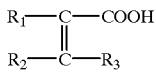
(1)-d

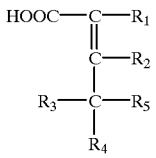
(1)-e wherein $R_1$, $R_2$, $R_3$, $R_4$ and $R_5$ are independently selected from the group consisting of
H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$ or COOH, $R_{2v}$ is selected from the group consisting of:
$CH_2$, $C_2H_4$, $C_3H_6$, $C_4H_8$, $C_5H_{10}$, $C_6H_{12}$, $C_7H_{14}$, $C_8H_{16}$, $C_9H_{18}$, $C_{10}H_{20}$ CHCOOH, $C(CH_3)COOH$, $C(C_2H_5)COOH$, $C(C_3H_7)COOH$ and $C(C_4H_9)COOH$, (B) an acid anhydride of the α,β-unsaturated carboxylic acids of (A), represented by either of 1(a) and 1(b) in the general formula (1) below,

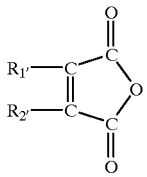
(1)-a wherein $R_1'$ is selected from the group consisting of:
H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$ and $C_{10}H_{21}$, $R_2'$ is selected from the group consisting of:
H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$ and $C_{10}H_{21}$,

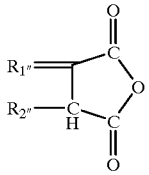
(1)-b wherein $R_1''$ is selected from the group consisting of:
$CH_2$, $C_2H_4$, $C_3H_6$, $C_4H_8$, $C_5H_{10}$, $C_6H_{12}$, $C_7H_{14}$, $C_8H_{16}$, $C_9H_{18}$, $C_{10}H_{20}$ CHCOOH, $C(CH_3)COOH$, $C(C_2H_5)COOH$, $C(C_3H_7)COOH$ and $C(C_4H_9)COOH$, $R_2''$ is selected from the group consisting of:
H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$ and $C_{10}H_{21}$, (C) one or more compounds having one or more double bonds in a molecule, represented by either of 2(a) and/or 2(b) in the general formula (2) below,

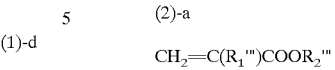
(2)-a $R_1'''$ is selected from the group consisting of
H and $CH_3$ $R_2'''$ is selected from the group consisting of:
H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$, $C_{19}H_{39}$, $C_{20}H_{41}$, $C_2H_4OH$, $C_3H_6OH$, $C_4H_9OH$, $C_5H_{10}OH$, $C_6H_{12}OH$, $C_7H_{14}OH$, $-CH_2CH_2N(CH_3)_2$, $-CH_2CH_2N(CH_2CH_3)_2$, $-CH_2CH_2OCOCH_2CH_2COOH$, $-CH_2CH_2OCOC(CH_3)=CH_2$, $-(CH_2CH_2O)_2COC(CH_3)=CH_2$, $-C_4H_8COC(CH_3)=CH_2$, $C_6H_{12}OCOC(CH_3)=CH_2$, $-CH_2C(CH_2=C(R_1''')COOCH_2)_2CH_2CH_3$, $-CH_2CH(OH)CH_2OCOC(CH_3)=CH_2$, $(CH_2CH_2O)_xCOC(CH_3)=CH_2$; $1 \leq X \leq 20$

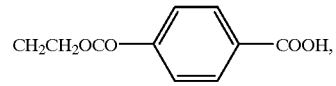

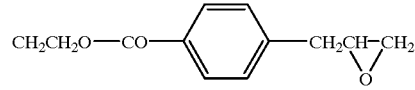

and

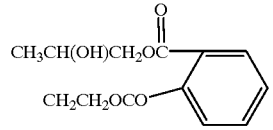

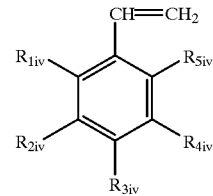
(2)-b wherein $R_{1iv}$, $R_{2iv}$, $R_{3iv}$, $R_{4iv}$, and $R_{5iv}$ are independently selected from the group consisting of H, $CH_3$, $C_2H_5$, $C_3H_7$, $C_4H_9$, $C5H_{11}$, $C_6H_{13}$, $C_7H_{15}$, $C_8H_{17}$, $C_9H_{19}$ and $C_{10}H_{20}$, which composition further comprises an epoxy compound or an oligomer thereof, which is compounded with chlorinated polyolefin after chlorination at a weight ratio of the epoxy compound or its oligomer to the aqueous chlorinated polyolefin-based resin of 0.1:100–50:100.

2. An aqueous, chlorinated polyolefin-based resin composition according to claim 1, wherein the epoxy compound is one or more monoglycidyl ethers.

3. The aqueous, chlorinated polyolefin-based resin composition according to claim 1, wherein the compound A and/or B are contained in the composition in an amount of 0.01 wt % to 60 wt %.

4. The aqueous, chlorinated polyolefin-based resin composition according to claim 1, wherein the compound C is contained in the composition in an amount of 0.01 wt % to 60 wt %.

5. The aqueous, chlorinated polyolefin-based resin composition of claim 1, further comprising a polymer containing an oxazoline group added in an amount between 0.01 wt % and 60 wt %, wherein the polymer containing an oxazoline group is selected from (meth)acryl polymers, urethane polymers and polyester polymers, and functions as a crosslinking agent.

6. A method of producing the composition of claim 5, wherein the polymer containing an oxazoline group is added during the preparation of or after the preparation of the chlorinated polyolefin-based resin composition.

7. An emulsion of an aqueous composition of claim 5, further comprising 0.01–20 weight parts, per 100 parts of the chlorinated polyolefin, of an organic or inorganic base substance, to neutralize the composition so that the pH has a value in the range of 5–10.

8. A method of producing the emulsion of claim 7, wherein the organic or inorganic base is added during the preparation of the aqueous chlorinated polyolefin-based resin composition.

9. The composition of claim 5, further comprising 0.01–100 wt parts per 100 parts of chlorinated polyolefin-based resin of a nonionic surfactant, an ionic surfactant or a cationic surfactant.

10. A method of producing the aqueous chlorinated polyolefin-based composition of claim 9, where the surfactant is added during the preparation of the aqueous chlorinated polyolefin-based resin composition.

11. The aqueous, chlorinated polyolefin-based resin composition according to claim 1, further comprising an aqueous-based polyurethane-based resin having a hydroxyl group, carboxyl group, and/or an isocyanate group in its molecule, or having no functioning groups, wherein the aqueous polyurethane-base resin is present in an amount between 0.01–2000 wt parts per 100 parts of the aqueous, chlorinated polyolefin-based resin composition.

12. A method for preparing the composition of claim 11, wherein the aqueous-based polyurethane-based resin is added during the preparation of or after the preparation of the aqueous, chlorinated polyolefin-based resin composition.

* * * * *